(12) United States Patent
Khosrowpour et al.

(10) Patent No.: US 12,499,038 B2
(45) Date of Patent: Dec. 16, 2025

(54) LATENCY AWARE DYNAMIC MEMORY MAP

(71) Applicant: DELL PRODUCTS L.P., Round Rock, TX (US)

(72) Inventors: Farzad Khosrowpour, Pflugerville, TX (US); Mitchell Markow, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/496,675

(22) Filed: Oct. 27, 2023

(65) Prior Publication Data
US 2025/0138997 A1    May 1, 2025

(51) Int. Cl.
*G06F 12/02*    (2006.01)
(52) U.S. Cl.
CPC .................. *G06F 12/023* (2013.01)
(58) Field of Classification Search
CPC .... G06F 12/023; G06F 3/067; G06F 12/0284; G06F 9/5016; G06F 15/167
See application file for complete search history.

(56) References Cited

U.S. PATENT DOCUMENTS

| | | | | |
|---|---|---|---|---|
| 10,404,579 | B1* | 9/2019 | Biemueller | H04L 41/0803 |
| 2018/0288137 | A1* | 10/2018 | Veeramani | H04L 67/34 |
| 2020/0133657 | A1* | 4/2020 | Yan | G06F 3/0604 |
| 2020/0142753 | A1* | 5/2020 | Harwood | G06F 9/4856 |
| 2021/0056085 | A1 | 2/2021 | Akerib et al. | |
| 2022/0121499 | A1* | 4/2022 | Butcher | G06F 9/4411 |
| 2022/0121634 | A1 | 4/2022 | Butcher | |
| 2022/0141151 | A1* | 5/2022 | He | H04L 67/1008 709/226 |
| 2023/0342223 | A1* | 10/2023 | Guim Bernat | G06F 9/5072 |

\* cited by examiner

*Primary Examiner* — Rocio Del Mar Perez-Velez
*Assistant Examiner* — Julian S Mendel
(74) *Attorney, Agent, or Firm* — Larson Newman, LLP

(57) ABSTRACT

An edge network includes an information handling system configured to manage a shared memory, and a client device. A series of edge systems each include a portion of the shared memory. The information handling system determines that the client device is bottlenecked in processing a service, locks data associated with the service in the shared memory of a first edge system, permits a second edge system to access the first data, and directs the second edge system to process the service.

16 Claims, 6 Drawing Sheets

LATENCY AWARE DYNAMIC MEMORY MAP

FIELD OF THE DISCLOSURE

This disclosure generally relates to information handling systems, and more particularly relates to providing a latency aware memory map in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An edge network may include an information handling system configured to manage a shared memory, a client device, and edge systems. Each edge system may include a portion of the shared memory. The information handling system may determine that the client device is bottlenecked in processing a service, lock data associated with the service in the shared memory of a first edge system, permit a second edge system to access the first data, and direct the second edge system to process the service.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
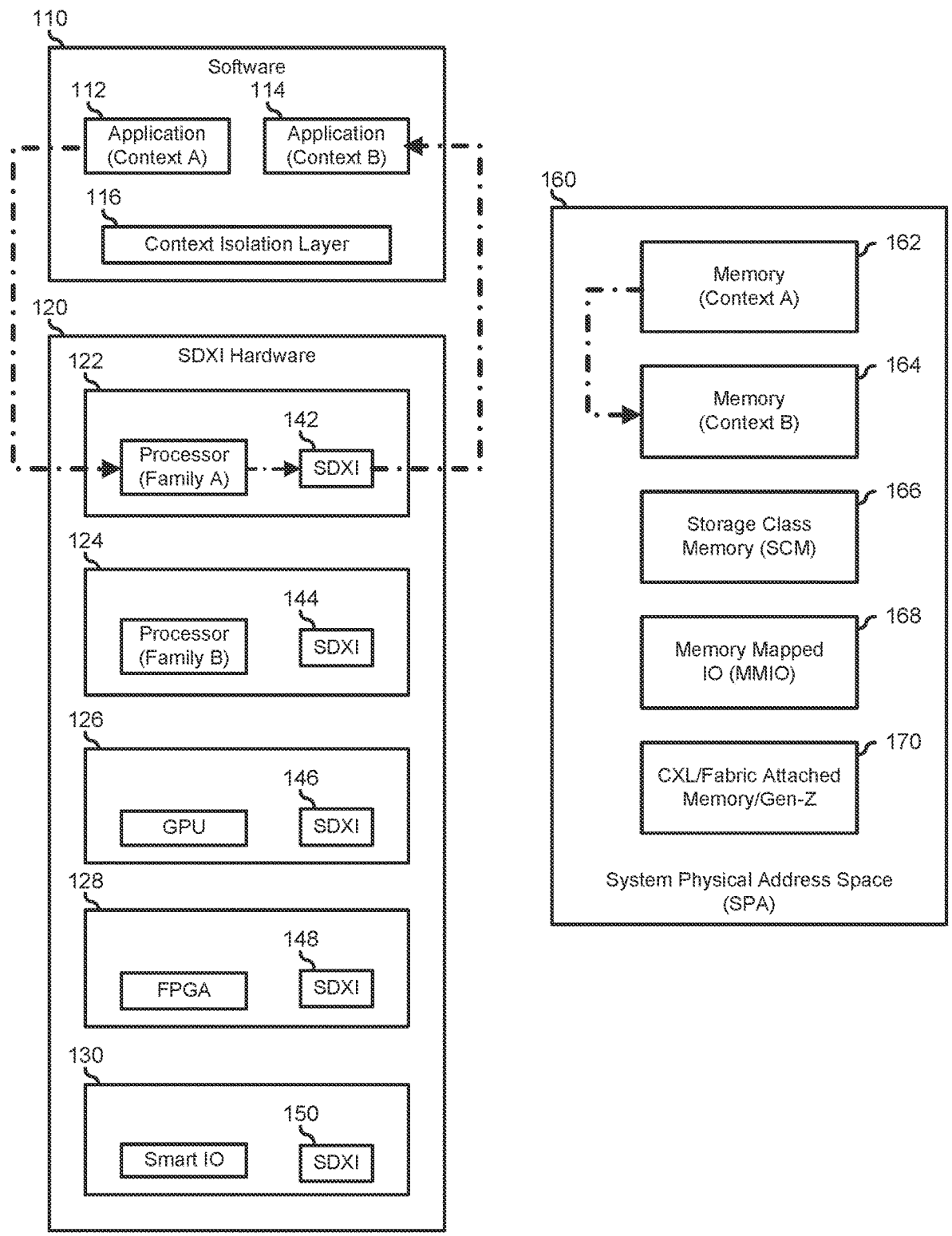
FIG. 1 is a block diagram of an information handling system according to an embodiment of the current disclosure.

FIG. 1 illustrates an information handling system 100 that utilizes a Smart Data Accelerator Interface (SDXI) data exchange architecture in accordance with an embodiment of the current disclosure. Information handling system 100 includes software 110, SDXI hardware 120, and a system physical address space (SPA) 160. SDXI hardware 120 includes a first family of processors 122 and an associated SDXI interface 142, a second family of processors 124 and an associated SDXI interface 144, one or more graphics processor unit (GPU) 126 and an associated SDXI interface 146, a field-programmable gate array (FPGA) 148 and an associated SDXI interface 148, and a Smart I/O device 130 and an associated SDXI interface 150. Software represents machine-executable code stored on information handling system 100 that is executable by a processor such as one or more of processors 122 and 124.

Software 110 includes a first application 112 that is associated with a first context, a second application 114 that is associated with a second context, and a context isolation layer 116. Software 110 may implement the data exchange architecture of information handling system 100, as needed or desired. As such, application 112 is associated with one or more address ranges in SPA 160, with the associated address ranges shown as a portion 162 of the SPA, and application 114 is associated with one or more address ranges in the SPA, with the associated address ranges shown as a portion 164 in the SPA. Context isolation layer 116 represents one or more agent, API, utility, or the like that operates to maintain the isolation between memory 162 and 164. As such, context isolation layer 116 operates to allocate memory 162 and memory 164 when respective application 112 and application 114 are instantiated on information handling system 100, and the context isolation layer prevents the use of various memory ranges by unauthorized applications.

The SDXI data exchange architecture represents an industry effort to expand and standardize data movement protocols and hardware accelerator interfaces. As such, information handling system 100 broadens the scope of data exchanges on both the hardware side and the memory side. In particular, on the hardware side, SDXI hardware 120 incorporates various types of processing elements, co-processors, accelerators, and other data movers, as typified by processor families 122 and 124, GPU 126, FPGA 128, and Smart I/O device 130. On the memory side, SPA 160 is expanded to include not only the system physical memory, as typified by memory 162 and memory 164, but also separately attached memory, such as Storage Class Memory (SCM) devices 166, memory mapped I/O (MMIO) devices 168, and memory architectures, such as Compute Express Link (CXL) and Gen-Z memory interfaces, fabric-attached memory, and the like, as shown collectively as memory device 170.

In particular, the SDXI data exchange architecture treats all of memory devices 162, 164, 166, 168, and 170 as a single SPA 160. The SDXI data exchange architecture then provides standardized interfaces for data movement between software 110, SDXI hardware 120, and SPA 160. SDXI interfaces 142, 144, 146, 148, and 150 represent hardware and software associated with their respective hardware devices, such that a common set of SDXI commands, instructions, procedures, calls, and the like, referred to hereinafter as "SDXI commands," can be made to the hardware devices. Details of implementing the various SDXI commands can be left to the design requirements and desires of the various hardware manufacturers. In this way the SDXI data exchange architecture remains extensible and forward-compatible with new hardware or memory developments, and is independent of actual data movement details, data acceleration implementations, and the underlying I/O interconnect technology.

The SDXI commands support: data movement between different address spaces including user address spaces located within different virtual machines; data movement without mediation by privileged software once a connection has been established; an interface and architecture that can be abstracted or virtualized by privileged software to allow greater compatibility of workloads or virtual machines across different servers; a well-defined capability to quiesce, suspend, and resume the architectural state of a per-address-space data mover to allow "live" workload or virtual machine migration between servers; mechanisms to enable forwards and backwards compatibility across future specification revisions, allowing software and hardware designed to different specification revisions to interoperate; the ability to incorporate additional offloads in the future leveraging the architectural interface; and a concurrent DMA model. As used herein, SDXI will be understood to represent any present or future specifications, specification revisions, articles, working papers, or other publications of the Smart Data Accelerator Interface (SDXI) Technical Working Group (TWG) of the Storage Networking Industry Association (SNIA).

Figure 2:
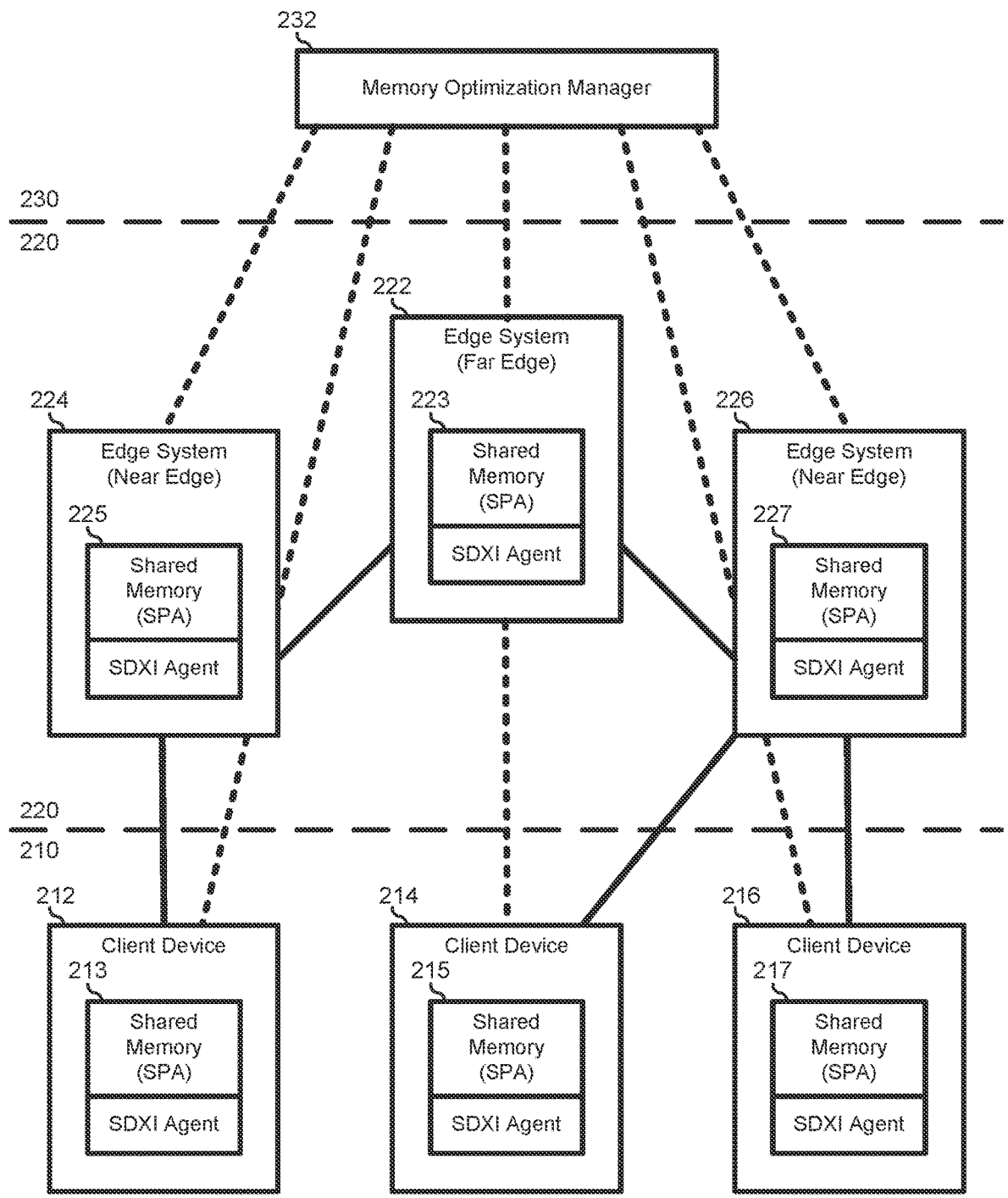
FIG. 2 is a block diagram of an edge network according to an embodiment of the current disclosure.

FIG. 2 illustrates an edge network 100 including, a client layer 210, an edge system layer 220, and a backend layer 230. Client system layer 210 includes client systems 212, 214, and 216. Edge system layer 220 includes edge system 222 (illustrated as a far edge system), and edge systems 224 and 226 (illustrated as near edge systems). Backend system 230 includes a memory optimization manager 232, described further below. Edge network 100 represents a network of information handling systems that provide various computing and data handling services to client devices 212, 214, and 216. Edge network 100 is illustrated as providing a hierarchical arrangement in edge system layer 220 in order to permit the optimized provision of services to client devices 212, 214, and 216.

For example, edge network 100 may represent a vehicle automation system, where each of client devices 212, 214, and 216 represent different vehicles. Here, the functionality of the vehicle automation system may be distributed between client devices 212, 214, and 216, and edge systems 222, 224, and 226. For example, functionality related to vehicle critical functions, such as engine management, braking, collision avoidance, and the like, may be time critical, and so such functionality may be provided within client systems 212, 214, and 216. On the other hand, functionality related to vehicle-to-vehicle systems, traffic systems, and the like, may be less time critical, but may be geographically associated with client devices 212, 214, and 216. Hence such functionality may be provided by near edge systems 224 and 226 that are located geographically proximate to the associated client systems 212, 214, or 216. Finally, functionality that is not time or space critical, such as vehicle navigation or entertainment systems may be performed more remotely from client systems 212, 214, and 216, such as in far edge system 222.

Edge network 100 utilizes the SDXI data exchange architecture, such that client devices 212, 214, and 216, and edge systems 222, 224, and 226 share a common SPA. In particular, client device 212 includes a portion of the shared memory 213, client device 214 includes a portion of the shared memory 215, client device 216 includes a portion of the shared memory 217, edge system 222 includes a portion of the shared memory 223, edge system 224 includes a portion of the shared memory 225, and edge system 226 includes a portion of the shared memory 227. Each of shared memory 213, 215, 217, 223, 225, and 227 includes a SDXI agent that operates to manage the sharing of data between the associated client devices 212, 214, and 216, and edge systems 222, 224, and 226, and the other devices and systems. In particular, note that the processing functionality provided within edge network 100 is distributed between client devices 212, 214, and 216, and edge systems 222, 224, and 226. As such, the data associated with a particular function may reside on one of shared memory 213, 215, 217, 223, 225, or 227, while the processing of the particular function may be performed by any one of client devices 212, 214, or 216, or edge systems 222, 224, or 226, as needed or desired.

For example, suppose that client devices 212, 214, and 216 are configured to perform a particular function on common data that is stored on far edge server 222 in shared memory 223. Then when, for example, client device 212 needs to perform the particular function, the SDXI agent associated with the client device requests the SDXI agent associated with shared memory 223 to lock the shared data while the client device operates on the shared data. Similarly functions that are distributed to one or more of edge systems 222, 224, or 226 may operate on data stored in any one of shared memory 213, 215, 217, 233, 235, or 237 by requesting the associated SDXI agent to lock the desired shared memory while the edge system operates on the shared data.

Figure 3:
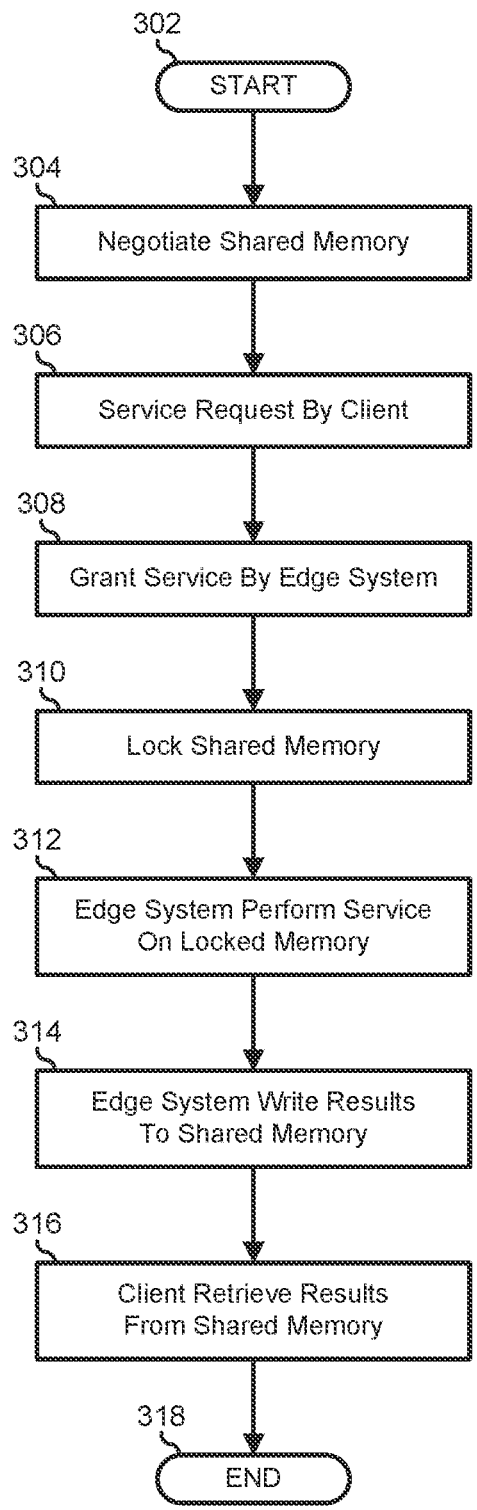
FIG. 3 is a flowchart illustrating a method for providing services for a client device by an edge system on shared memory according to an embodiment of the current disclosure.

FIG. 3 illustrates a method 300 for providing services for a client device by an edge system on shared memory, starting at block 302. A shared memory is negotiated between the client device and the edge system in block 304. The shared memory may be located at the client device, at the edge system, or elsewhere within an edge network, as needed or desired. The client device requests a service to be performed by the edge network in block 306. An edge system grants the service in block 308 and locks the shared memory in block 310. The edge system performs the service on the locked memory in block 312 and writes the result of the service to the shared memory in block 314. The client device retrieves the results of the service from the shared memory in block 316 and the method ends in block 318.

Returning to FIG. 2, memory optimization manager 232 operates to manage shared memory 213, 215, 217, 223, 225, and 227, and to coordinate the distribution of the shared data between the shared memory. In particular, when a service is requested, memory optimization manager 232 operates to coordinate the locking of the portion of shared memory 213, 215, 217, 223, 225, or 227 for the use by client device 212, 214, or 216, or edge system 222, 224, or 226, as described above with respect to FIG. 3. In a particular embodiment, memory optimization manager 232 operates to monitor key memory traffic metrics, such as access times, memory bandwidth, memory latency times, memory capacity, or the like, for shared memory 213, 215, 217, 223, 225, and 227. With the key metrics collected, memory optimization manager 232 operates to balance the loading on client devices 212, 214, and 216, and edge systems 222, 224, and 226. For example, if one of shared memory 213, 215, 217, 223, 225, or 227 is experiencing long access times, high bandwidth usage, high memory capacity usage, or the like, memory optimization manager 232 can operate to move the data from the affected shared memory to another shared memory that is experiencing shorter access times, lower bandwidth usage, or lower memory capacity usage, as needed or desired. For example, data associated with large language models (LLMs) may be moved closer to client devices 212, 214, and 216 (i.e., to near edge systems 224 and 226) to improve latency and real time accuracy.

In another embodiment, memory optimization manager 232 operates to monitor the operational state of client devices 212, 214, and 216, and edge systems 222, 224, and 226, to determine if the particular client devices and edge systems are experiencing processing bottlenecks, such as excessively long access times, high bandwidth usages, or capacity usages. In a first case, memory optimization manager 232 operates to direct the affected one of client devices 212, 214, or 216, or edge systems 222, 224, or 226, to offload one or more service from the affected client device or edge system to another client device or edge system. Here, memory optimization manager 232 may determine to move the selected services to a particular one of client devices 212, 214, or 216, or edge systems 222, 224, or 226 that is closer to the location within shared memory 213, 215, 217, 223, 225, or 227 where the associated data is stored. In another case, memory optimization manager 232 operates to move data associated with the particular service to a portion of shared memory 213, 215, 217, 223, 225, or 227 that is closer to the affected client device 212, 214, or 216, or edge system 222, 224, or 226, as needed or desired.

In another embodiment, memory optimization manager 232 operates to optimize the placement of data within shared memory 213, 215, 217, 223, 225, and 227. As illustrated client device 212, 214, and 216, and edge systems 222, 224, and 226 are connected together by solid lines, indicating more proximate network connectivity. Thus client device 212 is more proximately connected to near edge system 224, client devices 214 and 216 are more proximately connected to near edge system 226 and near edge systems 224 and 226 are connected to far edge system 222. Memory optimization manager 232 is illustrated as being connected together by dashed lines, indicating monitoring and control connections, to client devices 212, 214, and 216, and edge system 222, 224, and 226. Thus in a first example, memory optimization manager 232 may determine that a particular service is executed more predominantly on client device 212, and so the memory optimization manager may move data associated with that service to shared memory 213 to improve the efficiency of edge network 100. In another example, memory optimization manager 232 may determine that another service is executed by client devices 212, 214, and 216 more or less equally, and so the memory optimization manager may move data associated with the service to shared memory 223 to balance the access times between the client devices.

Figure 4:
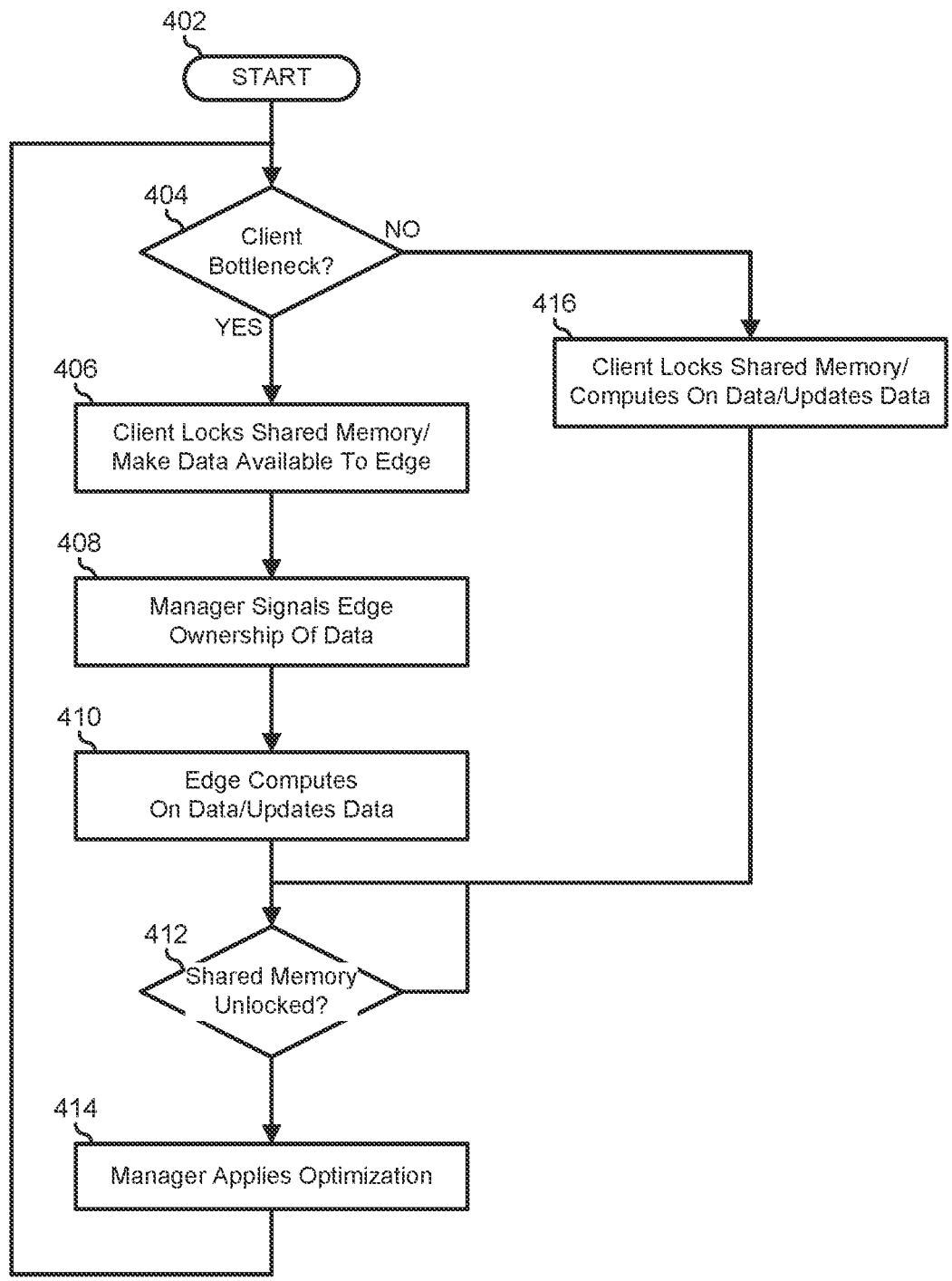
FIG. 4 is a flowchart illustrating a method for a client device to utilize the dynamic memory map embodiment of the current disclosure.

FIG. 4 illustrates a method 400 for a client device to utilize the dynamic memory map as described herein, starting at block 402. A decision is made as to whether or not a client device is experiencing a processing bottleneck in decision block 404. If not, the "NO" branch of decision block 404 is taken and processing proceeds to block 416, as described below. If the client device is experiencing a processing bottleneck, the "YES" branch of decision block 404 is taken, and the client device locks the shared memory associated with one or more process that is experiencing the bottleneck, making the associated data available to an edge system in block 406. A memory optimization manager signals an edge system to take ownership of the data in the shared memory in block 408, the edge system performs the service and updates the data in block 410, and processing proceeds to decision block 412 as described below.

Returning to decision block 404, when the client device is not experiencing a processing bottleneck, the "NO" branch of the decision block is taken and the client device locks the shared memory associated with a currently executing service, performs the processing on the data in the shared memory and updates the data in block 416, and the method proceeds to decision block 412. When either the edge system updates the data in the locked shared memory in block 410, or the client device updates the data in the locked shared memory in block 416, a decision is made as to whether or not the shared memory has been unlocked in decision block 412. If not, the "NO" branch of decision block 412 is taken and the method loops to decision block 412 until the shared memory is unlocked. When the shared memory is unlocked, the "YES" branch of decision block 414 is taken, the memory optimization manager applies optimization algorithms to optimize the placement of data within the shared memory in block 414, and the method returns to block 404 where a decision is made as to whether or not a client device is experiencing a processing bottleneck.

Figure 5:
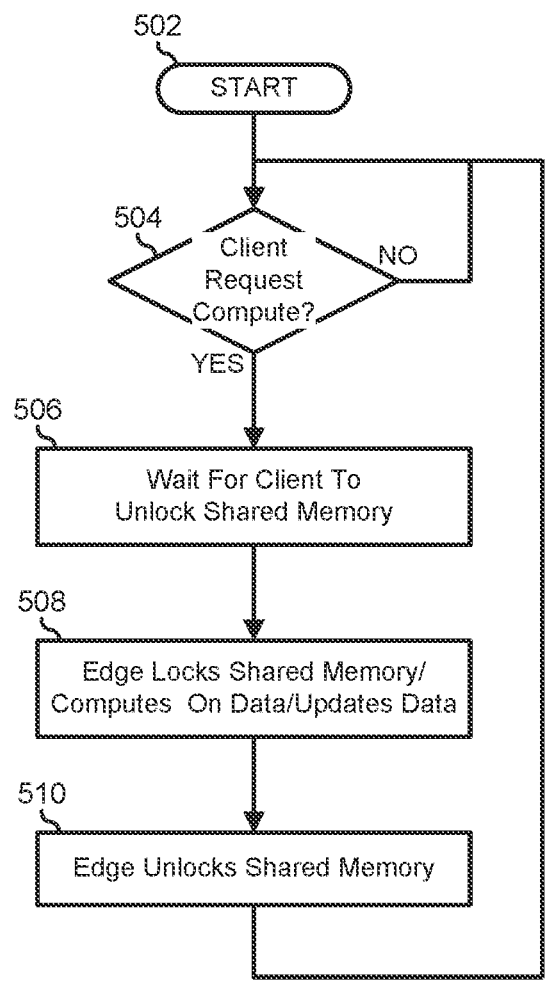
FIG. 5 is a flowchart illustrating a method for an edge system to provide the dynamic memory map according to an embodiment of the current disclosure.

FIG. 5 illustrates a method 500 for an edge system to provide the dynamic memory map as described herein, starting at block 502. A decision is made as to whether or not a client device is requesting compute services from an edge system in decision block 504. If not, the "NO" branch of decision block 504 is taken and the method loops back to decision block 504 until a client device requests compute services from an edge system. When the client device requests compute services from the edge system, the "YES" branch of decision block 504 is taken and the edge system waits for the client device to unlock the shared memory for the edge system in block 506. Once the client system unlocks the shared memory, the edge system locks the shared memory, performs the service on the data in the shared memory, and updates the data in block 508. The edge system unlocks the shared memory in block 510, and the method returns to decision block 504 to determine whether or not a client device is requesting compute services from an edge system.

Figure 6:
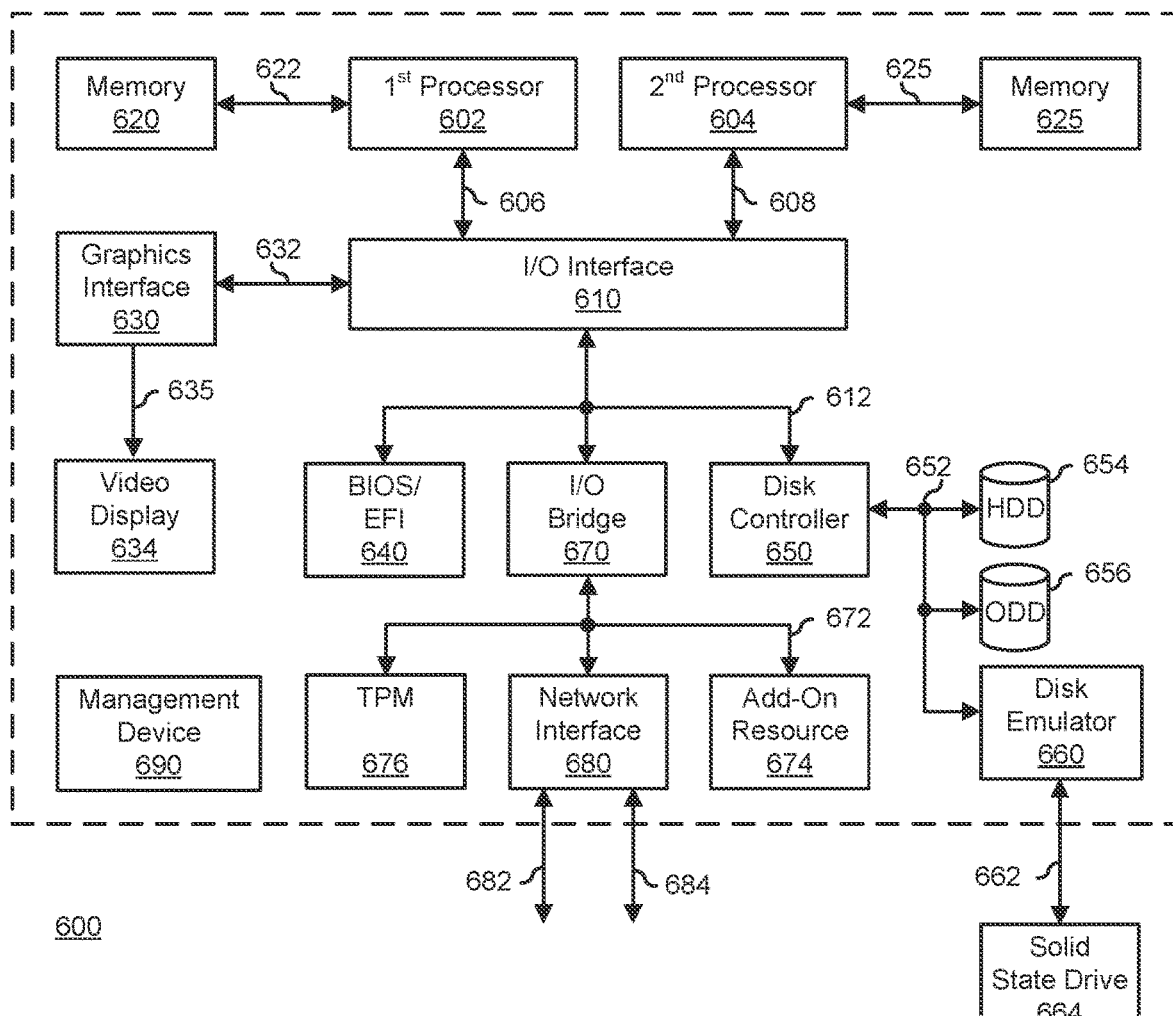
FIG. 6 is a block diagram illustrating a generalized information handling system according to another embodiment of the present disclosure.

FIG. 6 illustrates a generalized embodiment of an information handling system 600. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below, and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632, and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612, or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600. Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An edge network, comprising:
    an information handling system configured to manage a shared memory;
    a client device including a client Smart Data Accelerator Interface (SDXI) agent; and
    a plurality of edge systems, each edge system including a portion of the shared memory and an edge system SDXI agent;
    wherein the information handling system is further configured to determine that the client device is bottlenecked in processing a first service, to direct a first edge system SDXI agent to lock first data associated with the first service in the shared memory of a first edge system, to direct a second edge system SDXI agent to permit a second edge system to access the first data, and to direct the second edge system to process the first service; and
    wherein the information handling system is further configured to determine that the client device is bottlenecked in processing a second service, to move second data associated with the second service from the shared memory of a third edge system to the shared memory of a fourth edge system, to permit the client device to access the second data in the shared memory of the fourth edge system, and to direct the client device to process the second service, wherein the fourth edge system is closer in the edge network to the client device than the third edge system.

2. The edge network of claim 1 wherein in processing the first service, the second edge system is configured to write a result of the processing of the first service to the shared memory of the first edge system.

3. The edge network of claim 2, wherein the information handling system is further configured to determine that the second edge system has completed processing the first service.

4. The edge network of claim 3 wherein, when the processing of the first service is completed, the information handling system is further configured to direct the first edge system SDXI agent to unlock the first data in the shared memory of the first edge system.

5. The edge network of claim 1, wherein in processing the second service, the client device is configured to write a result of the processing of the second service to the shared memory of the fourth edge system.

6. The edge network of claim 5, wherein the information handling system is further configured to determine that the client device has completed processing the second service.

7. The edge network of claim 6, wherein, when the processing of the second service is completed, the information handling system is further configured to unlock the second data in the shared memory of the fourth edge system.

8. The edge network of claim 1, wherein the shared memory is a Smart Data Accelerator Interface shared memory.

9. A method, comprising:
    providing, in an edge network, an information handling system configured to manage a shared memory;
    providing, in the edge network, a client device;
    providing, in the edge network, a plurality of edge systems, each edge system including a portion of the shared memory;
    determining, by the information handling system, that the client device is bottlenecked in processing a first service;

locking first data associated with the first service in the shared memory of a first edge system;

permitting a second edge system to access the first data;

directing the second edge system to process the first service;

determining, by the information handling system, that the client device is bottlenecked in processing a second service;

moving second data associated with the second service from the shared memory of a third edge system to the shared memory of a fourth edge system, wherein the fourth edge system is closer in the edge network to the client device than the third edge system;

permitting the client device to access the second data in the shared memory of the fourth edge system; and directing the client device to process the second service.

10. The method of claim 9 wherein in processing the first service, the method further comprises writing a result of the processing of the first service to the shared memory of the first edge system.

11. The method of claim 10, further comprising determining that the second edge system has completed processing the first service.

12. The method of claim 11 wherein, when the processing of the first service is completed, the method further comprises unlocking the first data in the shared memory of the first edge system.

13. The method of claim 9 wherein in processing the second service, the method further comprises writing, by the client device, a result of the processing of the second service to the shared memory of the fourth edge system.

14. The method of claim 13, further comprising determining that the client device has completed processing the second service.

15. The method of claim 14 wherein, when the processing of the second service is completed, the method further comprises unlocking the second data in the shared memory of the fourth edge system.

16. The method of claim 9, wherein the shared memory is a Smart Data Accelerator Interface shared memory.

* * * * *